United States Patent
Sun et al.

(10) Patent No.: US 11,202,256 B2
(45) Date of Patent: Dec. 14, 2021

(54) LOW-POWER WIRELESS MESH NETWORK

(71) Applicant: Realtek Semiconductor Corp., HsinChu (TW)

(72) Inventors: Zaiqiang Sun, Shanghai (CN); Shimeng Zou, Suzhou (CN)

(73) Assignee: Realtek Semiconductor Corp., HsinChu (TW)

( * ) Notice: Subject to any disclaimer, the term of this patent is extended or adjusted under 35 U.S.C. 154(b) by 60 days.

(21) Appl. No.: 16/747,542

(22) Filed: Jan. 21, 2020

(65) Prior Publication Data

US 2020/0383047 A1    Dec. 3, 2020

(30) Foreign Application Priority Data

May 28, 2019    (CN) .......................... 201910452366.5

(51) Int. Cl.
*H04W 52/02* (2009.01)
*H04W 72/04* (2009.01)
*H04W 84/18* (2009.01)

(52) U.S. Cl.
CPC ... *H04W 52/0203* (2013.01); *H04W 72/0446* (2013.01); *H04W 84/18* (2013.01)

(58) Field of Classification Search
CPC ..... H04W 40/22; H04W 52/46; H04W 40/10; H04W 52/04; H04W 84/18; H04W 40/04; H04W 72/1289; H04W 84/22; H04W 52/0203; H04W 72/0446; G01D 21/00; H04B 7/026; A01G 25/16; Y02D 30/70
See application file for complete search history.

(56) References Cited

U.S. PATENT DOCUMENTS

2006/0056363 A1 * 3/2006 Ratiu ..................... H04W 40/22
370/338
2011/0111700 A1 * 5/2011 Hackett .................. A01G 25/16
455/41.2
2017/0034688 A1 * 2/2017 Kim ......................... G01S 5/26

* cited by examiner

*Primary Examiner* — Jung Liu
(74) *Attorney, Agent, or Firm* — Winston Hsu

(57) ABSTRACT

A wireless MESH network includes multiple low-power nodes. When serving as a data receiving node or a data relay node, each low-power node is configured to listen to data transmission at intervals.

6 Claims, 3 Drawing Sheets

LOW-POWER WIRELESS MESH NETWORK

CROSS REFERENCE TO RELATED APPLICATION

This application claims priority of China Application No. 201910452366.5 filed on 2019 May 28.

BACKGROUND OF THE INVENTION

1. Field of the Invention

The present invention is related to a wireless mesh network, and more particularly, to a wireless mesh network with low power consumption.

2. Description of the Prior Art

With rapid development in network technologies, various wireless networks have been continuously improved to provide better wireless communications. Among them, wireless mesh network (WMN) is one of the emerging technologies aimed at seamlessly connecting the world. A wireless mesh network may be deployed in a region without or not worthy of setting up any wired network in order to provide easy, effective and wireless connection in this region using inexpensive and existing technologies. Characterized in self-organized and self-organized abilities, a wireless mesh network can be easily deployed and maintained.

FIG. 1 is a diagram illustrating a prior art mesh network 100. The mesh network 100 includes a plurality of mesh nodes NM, each of which may serve as a data transmitting node, a data receiving node, or a data relay node. When serving as a data receiving node or a data relay node, each mesh nodes NM is configured to continuously monitor data communication in the mesh network 100 so as to ensure that data can be received and redirected on a real-time basis. Therefore, the prior art mesh network 100 consumes large power and requires large-capacity batteries when used in IoT products, which further increases manufacturing costs.

In the prior art mesh network 100, some of the mesh nodes NM may function in a sleeping mode for reducing power consumption. However, other mesh nodes NM are still required to continuously monitor the data transmission for serving as a data relay node or a data buffer node, thereby temporally storing the data which is sent to the mesh nodes NM currently operating in the sleeping mode. Therefore, even with the above-mentioned sleeping mode operation, the prior art mesh network 100 still consumes a considerable amount of power.

SUMMARY OF THE INVENTION

The present invention provides a wireless mesh network which includes a plurality of low-power nodes each configured to monitor data transmission at intervals when serving as a data receiving node or a data relay node.

The present invention also provides a method of transmitting and receiving signals in a wireless mesh network. The method includes a first low-power node of the wireless mesh network transmitting a signal, and a second low-power node of the wireless mesh network receiving the signal transmitted by the first low-power node during a receiving slot of a receiving period and stopping to receive the signal during a idle slot of the receiving period, wherein a length of the idle slot is larger than 0.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
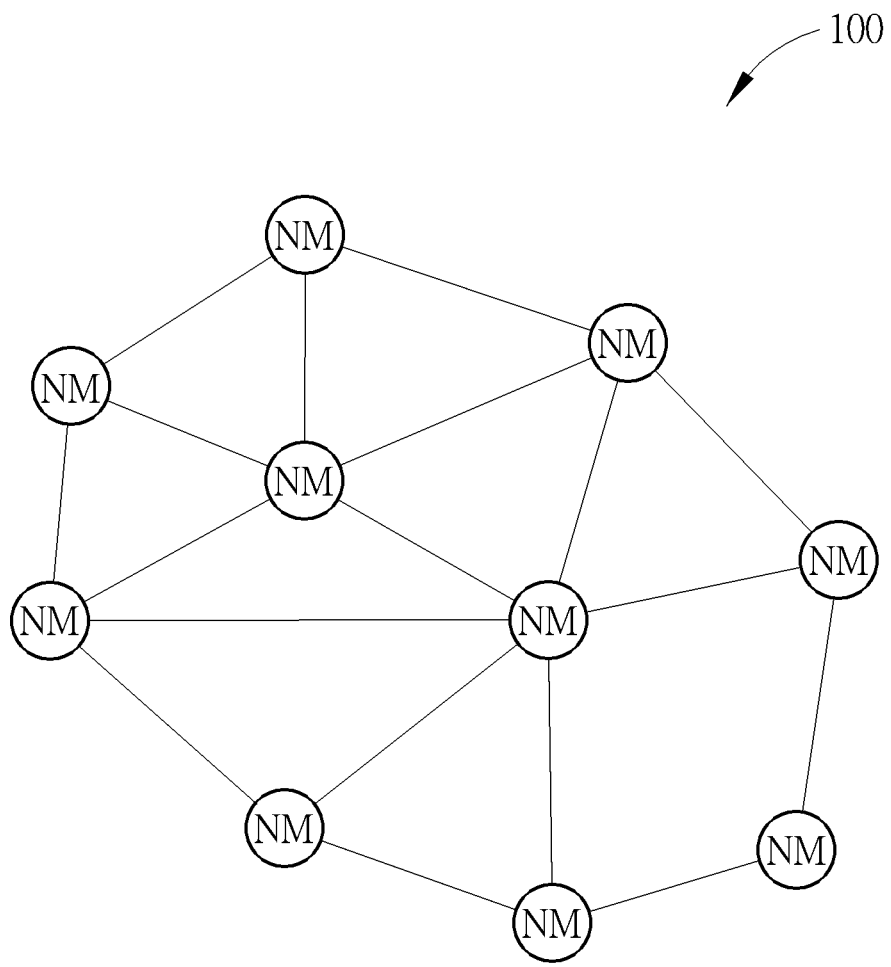
FIG. 1 is a diagram illustrating a prior art mesh network.
Figure 2:
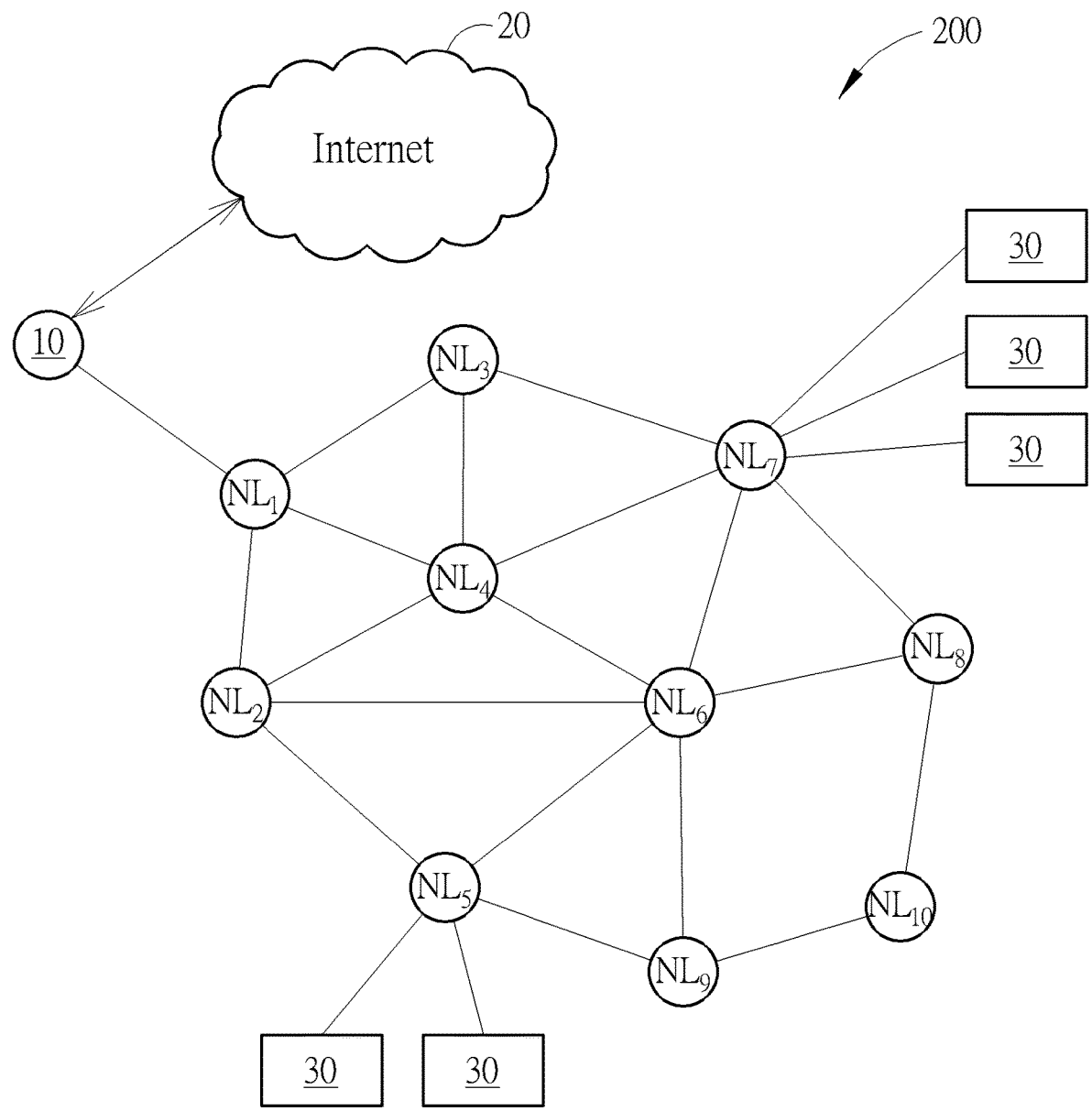
FIG. 2 is a diagram illustrating a wireless mesh network according to an embodiment of the present invention.

FIG. 2 is a diagram illustrating a wireless mesh network 200 according to an embodiment of the present invention. The mesh network 200 includes a mesh portal 10 and a plurality of low-power nodes $NL_1$~$NL_M$, wherein M is an integer larger than 1. For illustrative purpose, FIG. 2 depicts the embodiment when M=10. However, the amount of the low-power nodes in the wireless mesh network 200 does not limit the scope of the present invention.

The mesh portal 10 is a gateway between an Internet 20 and the plurality of low-power mesh nodes $NL_1$~$NL_M$, and configured to provide data routing from the wireless mesh network 200 to the Internet 20 or from the Internet 20 to the wireless mesh network 200. The plurality of low-power nodes $NL_1$~$NL_M$ may directly provide wireless Internet access to one or multiple mobile stations 30 using wireless access link.

In the wireless mesh network 200 of the present invention, each of the low-power nodes $NL_1$~$NL_M$ may serve as a data transmitting node, a data receiving node, or a data relay node. When a first low-power node $NL_1$ serving as a data transmitting node is located within the coverage range of a second low-power node $NL_2$ serving as a data receiving node, a wireless mesh link may be established between these two low-power nodes for data communication. These low-power nodes $NL_1$~$NL_M$ and the mesh portal 10 form a mesh distribution system in which the first low-power node $NL_1$ serving as a data transmitting node may transmit data to the second low-power node $NL_2$ serving as a data relay node, and the second low-power node $NL_2$ serving as a data transmitting node may transmit data to the third low-power node $NL_3$ serving as a data receiving node. The process continues until data has reached its target low-power node.

Figure 3:
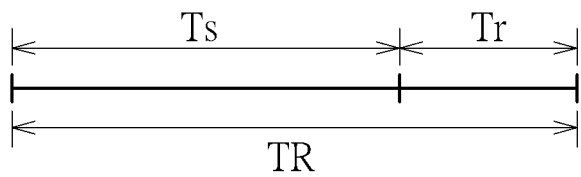
FIG. 3 is a diagram illustrating the operation of the low-power nodes in a wireless mesh network when serving as a data receiving node or a data relay node according to an embodiment of the present invention.
Figure 4:
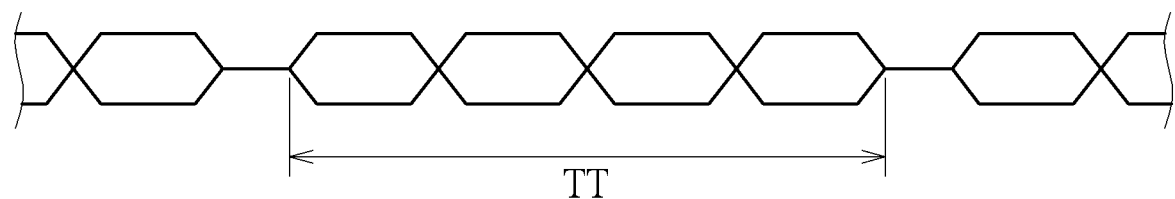
FIG. 4 is a diagram illustrating the operation of the low-power nodes in a wireless mesh network when serving as a data transmitting node according to an embodiment of the present invention.
Figure 5:
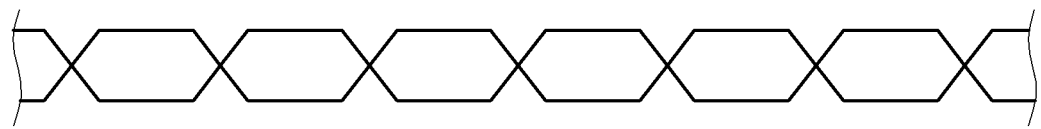
FIG. 5 is a diagram illustrating the operation of the low-power nodes in a wireless mesh network when serving as a data transmitting node according to another embodiment of the present invention.

FIG. 3 is a diagram illustrating the operation of the low-power nodes $NL_1$~$NL_M$ in the wireless mesh network 200 when serving as a data receiving node or a data relay node according to an embodiment of the present invention. FIG. 4 and FIG. 5 are diagrams illustrating the operation of the low-power nodes $NL_1$~$NL_M$ in the wireless mesh network 200 when serving as a data transmitting node according to embodiments of the present invention.

As depicted in FIG. 3, when serving as a data receiving node or a data relay node, the low-power nodes $NL_1 \sim NL_M$ are configured to receive signals at intervals, wherein TR represents the length of a receiving period, Tr represents the length a receiving slot in the receiving period TR (0<Tr<TR), and Ts represents the length of an idle slot in the receiving period TR (Ts>0). Since the low-power nodes $NL_1 \sim NL_M$ are only required to operate during the receiving slot Tr in each receiving period TR, the power consumption when monitoring data communication at intervals may be reduced to Tr/TR of the power consumption of a prior art mesh network which continuously monitors data transmission.

As depicted in FIGS. 4 and 5, when serving as a data transmitting node, the low-power nodes $NL_1 \sim NL_M$ are configured to transmit signals during each transmitting period TT whose length is larger than or equal to the receiving period TR (the embodiment of FIG. 4) or continuously transmit signals (the embodiment of FIG. 5) so as to ensure that data can be received by another data receiving node or data relay node.

Meanwhile, data communication in the wireless mesh network 200 of the present invention may be terminated by any low-power node. In an embodiment, any low-power node may transmit a termination signal whose length is larger than or equal to the receiving period TR, and other low-power nodes may stop transmitting signals when receiving the termination signal.

In conclusion, the present invention provides a wireless mesh network which includes a plurality of low-power nodes each configured to monitor data transmission at intervals when serving as a data receiving node or a data relay node, thereby reducing power consumption of the wireless mesh network.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A wireless mesh network, comprising:
a plurality of low-power nodes each configured to monitor data transmission at intervals when serving as a data receiving node or a data relay node, wherein:
each low-power node is configured to receive signals during a receiving slot of a receiving period and stop receiving signals during an idle slot of the receiving period when serving as the data receiving node or the data relay node, and a length of the idle slot is larger than 0; and
a first low-power node among the plurality of low-power nodes is further configured to transmit a termination signal whose length is larger than or equal to the length of the receiving period.

2. The wireless mesh network of claim 1,
wherein each low-power node is configured to transmit signals during a transmitting period when serving as a data transmitting node, and a length of the transmitting period is larger than or equal to the length of the receiving period.

3. The wireless mesh network of claim 1,
wherein a second low-power node among the plurality of low-power nodes is further configured to stop transmitting signals when receiving the termination signal.

4. A method of transmitting and receiving signals in a wireless mesh network, comprising:
a first low-power node of the wireless mesh network transmitting a signal; and
a second low-power node of the wireless mesh network receiving the signal transmitted by the first low-power node during a first receiving slot of a first receiving period and stopping to receive the signal during a first idle slot of the first receiving period, wherein a length of the first idle slot is larger than 0; and
the first low-power node transmitting a termination signal whose length is larger than or equal to the length of the receiving period.

5. The method of claim 4, further comprising:
the first low-power node transmitting the signal during a first transmitting period, wherein a length of the first transmitting period is larger than or equal to a length of the first receiving period.

6. The method of claim 4, further comprising:
the second low-power node transmitting the signal during a second transmitting period; and
a third low-power node of the wireless mesh network receiving the signal transmitted by the second low-power node during a second receiving slot of a second receiving period and stopping to receive the signal during a second idle slot of the second receiving period, wherein a length of the second idle slot is larger than 0 and a length of the second transmitting period is larger than or equal to a length of the second receiving period.

* * * * *